United States Patent
Stadler

(10) Patent No.: US 9,132,807 B2
(45) Date of Patent: Sep. 15, 2015

(54) AUTONOMOUS OPERATION OF A MOTOR VEHICLE IN A CAR WASH

(71) Applicant: Audi AG, Ingolstadt (DE)

(72) Inventor: Michael Stadler, Arnsberg (DE)

(73) Assignee: AUDI AG, Ingolstadt (DE)

(*) Notice: Subject to any disclaimer, the term of this patent is extended or adjusted under 35 U.S.C. 154(b) by 137 days.

(21) Appl. No.: 13/965,850

(22) Filed: Aug. 13, 2013

(65) Prior Publication Data
US 2014/0048104 A1  Feb. 20, 2014

(30) Foreign Application Priority Data
Aug. 14, 2012 (DE) .............. 10 2012 016 039

(51) Int. Cl.
| | |
|---|---|
| B08B 7/04 | (2006.01) |
| B60S 3/04 | (2006.01) |
| G05D 1/02 | (2006.01) |
| G08G 1/04 | (2006.01) |
| G08G 1/042 | (2006.01) |
| B62D 15/02 | (2006.01) |
| B60W 30/12 | (2006.01) |
| B60S 3/00 | (2006.01) |
| B08B 3/02 | (2006.01) |
| B08B 3/00 | (2006.01) |
| B08B 1/00 | (2006.01) |
| B64D 37/00 | (2006.01) |
| B64F 1/00 | (2006.01) |
| B64C 39/00 | (2006.01) |
| G01C 22/00 | (2006.01) |

(52) U.S. Cl.
CPC .... *B60S 3/04* (2013.01); *B60S 3/00* (2013.01); *B60W 30/12* (2013.01); *B62D 15/025* (2013.01); *G05D 1/021* (2013.01); *G05D 1/0246* (2013.01); *G05D 1/0255* (2013.01); *G05D 1/0257* (2013.01); *G08G 1/04* (2013.01); *G08G 1/042* (2013.01); *B08B 1/00* (2013.01); *B08B 1/002* (2013.01); *B08B 3/00* (2013.01); *B08B 3/02* (2013.01); *B08B 3/022* (2013.01); *B08B 3/024* (2013.01); *B60S 3/004* (2013.01); *B64C 39/00* (2013.01); *B64D 37/00* (2013.01); *B64F 1/00* (2013.01); *G01C 22/00* (2013.01)

(58) Field of Classification Search
CPC .......... B64F 1/00; B64C 39/00; B64D 37/00; B64D 9/00; G01C 22/00; B60S 3/00; B60S 3/004; B60S 3/04; B08B 1/00; B08B 1/002; B08B 3/00; B08B 3/02; B08B 3/022; B08B 3/024

See application file for complete search history.

(56) References Cited

U.S. PATENT DOCUMENTS

| | | | |
|---|---|---|---|
| 2,646,586 A * | 7/1953 | Foutes ................ | 15/97.3 |
| 2004/0267411 A1 | 12/2004 | Mayer et al. | |
| 2005/0246078 A1* | 11/2005 | Vercammen ............ | 701/23 |
| 2007/0090688 A1 | 4/2007 | Haemmerling et al. | |
| 2008/0066790 A1* | 3/2008 | Rems ................ | 134/123 |

FOREIGN PATENT DOCUMENTS

| | | |
|---|---|---|
| DE | 103 22 765 | 1/2005 |
| DE | 10 2004 009 465 | 9/2005 |
| DE | 10 2005 058 628 | 6/2007 |

* cited by examiner

Primary Examiner — Bibi Carrillo
(74) Attorney, Agent, or Firm — Henry M. Feiereisen LLC

(57) ABSTRACT

A method for autonomously driving a motor vehicle in a car wash as well as a corresponding car wash is proposed in order to enhance the comfort and safety when autonomously driving through the car wash. The position and the orientation of the motor vehicle are detected by a sensor system of the car wash and transmitted to the motor vehicle. This makes it possible to automatically enter and move the vehicle onward in a car wash.

10 Claims, 2 Drawing Sheets

AUTONOMOUS OPERATION OF A MOTOR VEHICLE IN A CAR WASH

CROSS-REFERENCES TO RELATED APPLICATIONS

This application claims the priority of German Patent Application, Serial No. 10 2012 016 039.9, filed Aug. 14, 2012, pursuant to 35 U.S.C. 119(a)-(d), the content of which is incorporated herein by reference in its entirety as if fully set forth herein.

BACKGROUND OF THE INVENTION

The present invention relates to a method for autonomously driving a motor vehicle in a car wash. Moreover, the present invention relates to a car wash which is configured for autonomously driving a vehicle.

The following discussion of related art is provided to assist the reader in understanding the advantages of the invention, and is not to be construed as an admission that this related art is prior art to this invention.

Car washes for vehicles are becoming increasingly more popular because the motor vehicle can be fully cleaned automatically in a relatively short time. The driver need not lend a hand in any cleaning phase.

There are various types of car washes. In one type, the driver of the vehicle drives into the car wash, turns the engine off, optionally leaves the vehicle, the washing and subsequent drying operation start and the driver finally drives the vehicle out of the car wash. In another type, the vehicle is automatically pulled with a tow chain from a washing chamber into a drying chamber, wherein the vehicle must be in idle. In still another type, the driver must drive the vehicle after the washing operation from a washing chamber to a drying chamber.

In any of these situations, the driver must drive the vehicle very precisely to a predetermined washing position in the car wash. Mostly, rails are set which limit the lateral position of the vehicle. An optical signal often indicates in the travel direction that the correct washing position has been reached. If necessary, the car needs to be driven for a short distance in reverse. In some situations, as indicated above, the driver needs to drive the vehicle onward from a washing position to a drying position in a drying chamber. This requires the driver to navigate a very narrow passage and pull up exactly at a specified position. This driving mode in car washes is for most drivers at least uncomfortable, and for others not even possible.

It would therefore be desirable and advantageous to obviate prior art shortcomings and to make driving motor vehicles through car washes more comfortable.

SUMMARY OF THE INVENTION

According to one aspect of the present invention, a method for autonomously driving a motor vehicle in a car wash includes detecting a vehicle position and a vehicle orientation of the vehicle in or on the car wash with a detector integrated in the car wash in order to produce respective first data, transmitting the first data from the car wash to the motor vehicle, automatically moving the vehicle into the car wash based on the received first data, transmitting the second data from the car wash to the motor vehicle subsequent to a predetermined step in a washing process of the motor vehicle, automatically controlling further driving of the motor vehicle inside or out of the car wash depending on the second data.

According to another aspect of the present invention, a car wash is configured for autonomously driving a motor vehicle, with a detection device for detecting a vehicle position and a vehicle orientation of the motor vehicle in or on the car wash and for generating corresponding first data, a transmitting device for transmitting the first data from the detector to the motor vehicle and for transmitting second data from the car wash to the motor vehicle in a predetermined step in a washing process of the motor vehicle, wherein the first data enable the motor vehicle to automatically enter the car wash, and the second data are configured for causing the motor vehicle to automatically move ahead inside or out of the car wash.

The car wash sends to its surroundings an identification signal (ping) about the identity and/or the type of the car wash as well as about its exact location. When the vehicle receives this identification signal, the driver can be informed about the opportunity for autonomously navigating the car wash. When required, the vehicle then drives automatically, semi-automatically or manually to the entrance of the car wash.

According to an advantageous feature of the present invention, a motor vehicle may enter a car wash fully automatically, remain there during the washing and optionally the drying process, and subsequently drive again out of the car wash forward or backward and fully automatic. This fully automatic driving can be described as autonomous driving in a car wash, wherein the driver either exits the car and the vehicle drives autonomously without a driver, or the driver simply remains seated and moves along with the vehicle.

The method according to the invention and the car wash according to the invention advantageously lower the cost for the vehicle, when it is autonomously driven in the car wash, compared to the case where the autonomous driving is controlled by onboard sensors. Furthermore, the vehicle weight can be reduced by installing the sensors in the car wash, since the respective onboard sensors can be eliminated.

Advantageously, the position and/or the orientation of the vehicle may be detected with ultrasound, radar or lasers. Such sensor systems are characterized by their high accuracy.

Alternatively or additionally, the position and/or the orientation of the vehicle may be detected based on images from the camera, capacitive measurements or inductive measurements. Such sensor systems are characterized by their reliability, especially in a car wash.

According to another advantageous feature of the present invention, the first and/or second data may be transmitted wirelessly from the car wash to the vehicle. In this way, a communication between the vehicle and the car wash can be established without major expenditures already before the car wash and also after the car wash.

Advantageously, the first and/or second data may be transmitted via Bluetooth or WLAN. However, other standard transmission methods may also be used. This obviates the need for special communication interfaces, since standard communication methods may be used.

According to another advantageous feature of the present invention, the vehicle may occupy a washing position after entering the car wash and may be moved onward to the drying position in a car wash. The vehicle hereby advantageously receives a go-ahead signal from the car wash, which triggers the onward move. This is advantageous, for example, when the car wash is composed of a washing chamber and a drying chamber and the motor vehicle should be moved automatically from the washing position in the washing chamber to a drying position in the drying chamber without driver intervention.

According to another advantageous feature of the present invention, the onward drive may also involve exiting the car wash. The method according to the invention can hence also be used for car washes that have only a single chamber for washing and drying.

According to another advantageous feature of the present invention, a driver of the motor vehicle may automatically be notified about exiting the car wash after an automatic exit from the car wash. This is particularly advantageous in situations where the driver has left the vehicle before entering the car wash and the vehicle navigates autonomously through the car wash without a driver. The driver need then not be in close proximity to the car wash, but can receive the message also on a display screen located for example in a lounge or restaurant or also, for example, on a mobile phone or on another mobile output device.

According to another advantageous feature of the present invention, the opportunity for autonomous driving may be displayed to a driver in the vehicle before automatically entering the car wash. The driver is thereby ensured that the communication between the car wash and vehicle operates properly and that he can thus switch without reservation into a fully automatic or autonomous mode.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
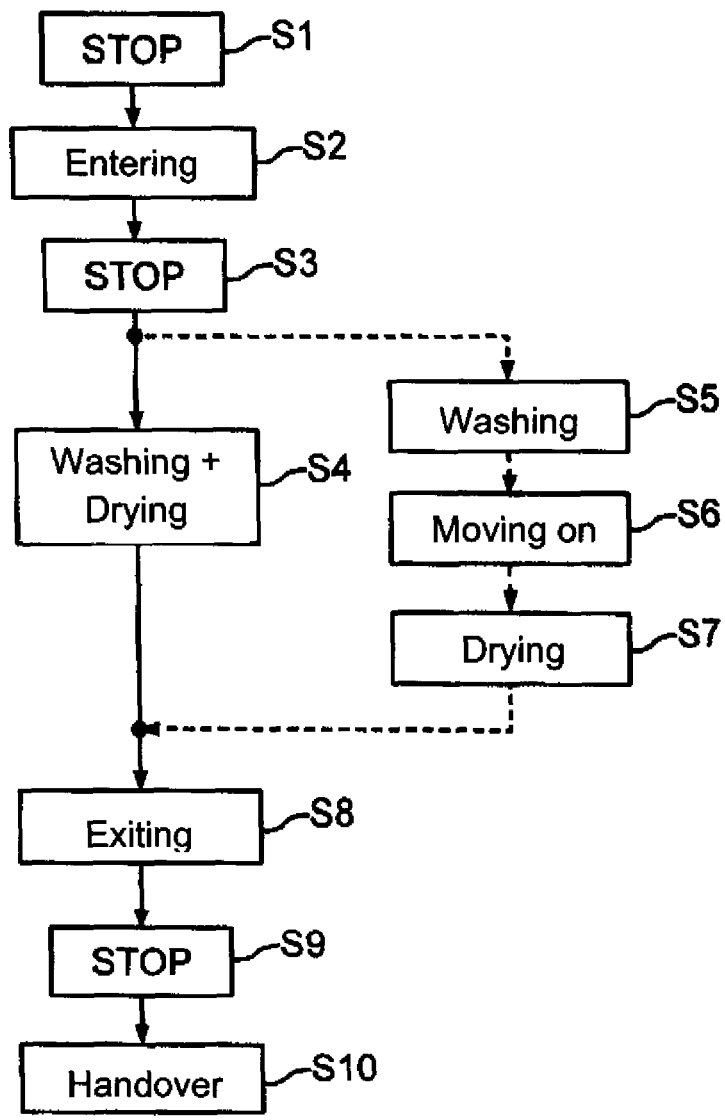
FIG. 1 shows schematically a process flow according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a process flow for autonomously driving a motor vehicle in a car wash.

Entering and/or driving through a car wash with a motor vehicle hereby occur autonomously. This means that the driver can leave the car and that the motor vehicle, especially a passenger car, moves through the car wash entirely automatically. Alternatively, the driver can remain seated in the car and is automatically driven through the car wash.

A car wash is here to be understood as any type of car wash facility, in which a motor vehicle is washed and optionally dried. This includes, as mentioned above, car washes where the vehicle is at rest during the wash process and optionally the drying process, where the vehicle continuously moves during the wash and/or the drying process, or where the vehicle is after washing only moved from a washing position into a drying position. Generally, the method according to the invention can also be applied to other car washes, where a vehicle must be driven.

Figure 2:
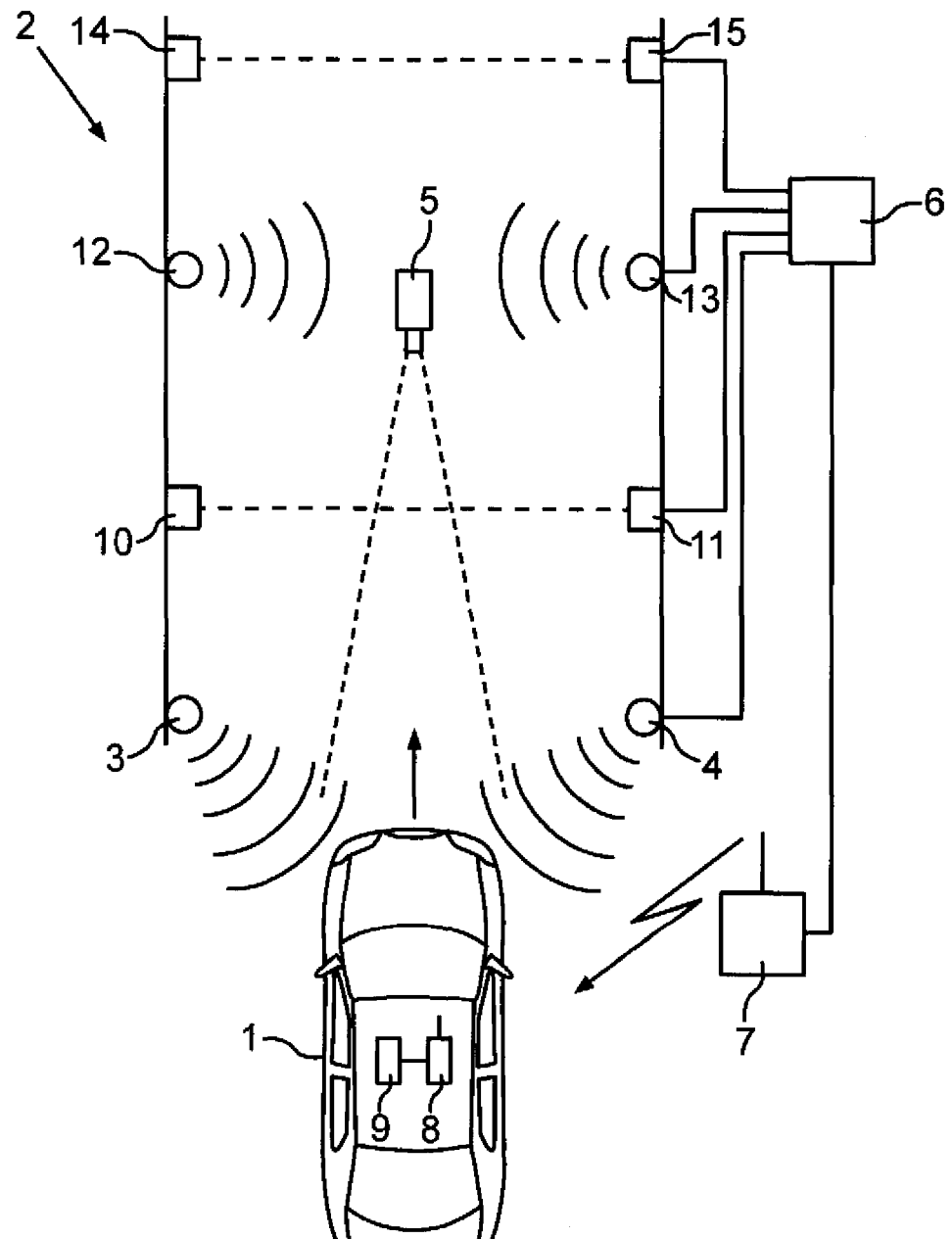
FIG. 2 is a plan view of a car wash, which can be autonomously navigated.

In the example of FIG. 1, a driver drives the vehicle 1 to be washed to a car wash 2 (see also FIG. 2). Optionally, the car wash sends to its surroundings an identification signal (ping) about the identity and/or the type of car wash and its exact location. When the motor vehicle 1 receives of this identification signal, the driver can be informed about the opportunity of an autonomously drivable car wash. The vehicle 1 then drives, as needed, automatically, semi-automatically or manually to the entrance of the car wash.

Regardless of whether the vehicle is driven in front of the car wash automatically, semi-automatically or manually, the driver must be signaled before switching into autonomous mode, when an autonomous or fully automated driving in/on the car wash is at all possible. Once this is possible, the operator can start a handover procedure. For this purpose, he stops the vehicle at step S1 of FIG. 1 and activates the autonomous mode of the vehicle. If the vehicle is equipped with a manual transmission, then the driver for the transfer may need to switch to idle.

To activate the autonomous mode of the vehicle, the driver presses for example a button or another actuator in the vehicle. Alternatively, he may also input in the vehicle controller a corresponding verbal trigger signal or a trigger signal via a mobile device (e.g. a mobile phone).

For automatically entering the car wash, the vehicle position and the orientation of the vehicle in or on the car wash must be detected. For this purpose, the car wash has appropriate sensors, as will be described in more detail in conjunction with FIG. 2, for example distance sensors based on ultrasound located in the entrance area. These sensors are part of a detector system integrated to the car wash. The data generated by the sensors or by a downstream signal processing device contain information about the vehicle position and the vehicle orientation.

This information relating to the vehicle position and vehicle orientation before or during a switch into the autonomous mode must be transferred from the car wash to the vehicle as raw data or in processed form. Particularly suitable for the data transmission is wireless communication. Preferably, standard communication protocols such as Bluetooth, WLAN and the like are being used.

The data to be transmitted (first data) about the vehicle position and the vehicle orientation can be transmitted from the car wash to the vehicle already prior to the autonomous operation or before the autonomous mode is activated. Alternatively, these data are transmitted only after the autonomous mode has been activated. The vehicle position and the vehicle orientation are here relative to a specified driving corridor in the car wash.

After the autonomous mode has been activated, the car wash is automatically entered at step S2. For this purpose, the vehicle controller used the first data received from the wash and optionally additional data from the on-board sensors.

The vehicle must now enter the car wash to reach a predetermined washing position without driver support. I.e., the vehicle must stop at the washing position at step S3. This stop occurs automatically when the sensor system of the car wash has detected that the washing position has been reached, or when the vehicle was informed by the first data about a length of a travel path from the current position prior to entering the car wash to the prescribed washing position.

The car wash detects in a conventional manner when the washing position is reached and starts the processing steps relating to washing and possibly drying the vehicle at step S4. Alternatively, the processing steps relating to washing and drying may also be started manually.

In the above-described case, the vehicle is washed and dried at a single position, here the washing position. However, when the driver drives his vehicle to a different car wash with a washing chamber and a separate drying chamber, then the vehicle must be moved after washing into the drying chamber. This different type of car wash was transmitted to the vehicle, optionally automatically in the identification signal of the car wash at the beginning of the autonomous driving or before the autonomous driving. Specifically adapted to the type of car wash, washing is then performed at step S5, after the vehicle has stopped in the washing position in accordance with step S3. After the last processing step of the washing process, the car wash transmits a signal to the vehicle to move onward. The onward driving signal includes second data and is transmitted from the car wash to the vehicle after a predetermined step in a washing process of the motor vehicle (for example, the last washing step).

Triggered by this onward driving signal, the vehicle and/or the engine is restarted, the appropriate gear is engaged and the vehicle moves at step S6 onward from the washing position into a drying position, i.e. from the washing chamber into a drying chamber. When the vehicle reaches the drying position, it may switch back to idle and the engine may be turned off. Thereafter, the various drying steps are performed by the car wash at step S7.

After the steps S4 and S7, the vehicle is cleaned and can exit the car wash. For this purpose, the vehicle receives from the car wash a control pulse, i.e. an exit signal. The second data transmitted from the car wash to the vehicle after step S4 can therefore also represent or include an exit signal. Third data containing the exit signal are transmitted to the vehicle after step S7 or the last drying step.

After receiving this exit signal, the vehicle starts the engine and engages the suitable gear or appropriate driving mode. By starting the motor, another part of the autonomous driving has begun, namely exiting from the wash at step S8. The vehicle moves automatically onward through the corridor of the car wash until it has left the car wash facility. The sensors of the vehicle detect that the vehicle has completely exited from the car wash facility, i.e. it is in a pick-up position outside the car wash facility. The vehicle in autonomous mode is automatically stopped in this pick-up position, it is switched to idle and the engine is optionally stopped (step S9).

The pick-up position need not be located directly at the exit of the car wash facility. Instead, the pick-up position may also be located on a waiting parking lot and may, if necessary, be determined dynamically by the vehicle and the car wash facility. Such a waiting parking lot would have the advantage that the vehicle need not be picked up by the driver immediately after exiting the car wash. Instead, the driver may have stopped, for example, in the adjacent gas station to have, for example, a cup of coffee while the vehicle moves completely autonomously through the car wash. After washing is complete, the driver can then be informed, for example, on a display screen in the gas station that his vehicle ready to be picked up. Alternatively, the driver may also receive a message on his mobile phone or another mobile device that his car is ready. The driver can then pick up his vehicle when he has time.

In any case, a handover to the driver must occur after the autonomous driving at step S10. This handover occurs essentially by turning off the autonomous mode. To this end, depending on the situation, the vehicle must automatically switch to idle and optionally stop the engine. The driver can then safely take over the vehicle.

Alternatively, the transfer at step S10 can also occur immediately after the autonomous stop at step S9, if the driver has remained seated in the vehicle while driving through the car wash. In this case, for example the engine can continue to run and only the idle is engaged in the autonomous mode and the parking brake is activated. To continue driving manually, the driver then only needs to release the parking brake and engage the gear.

FIG. 2 shows a schematic plan view of an exemplary car wash which allows autonomous operation of the vehicle during washing. The motor vehicle 1 is here positioned in front of the car wash 2 or in front of the car wash facility. Sensors 3 and 4 capture, optionally together with a camera 5, the orientation of the vehicle and the position of the vehicle. The sensors 3, 4 are, for example, ultrasonic, radar or laser sensors. If necessary, inductive, capacitive, or other optical sensors may also be employed. An arbitrary number of sensors can be chosen for detecting the vehicle position and vehicle orientation prior to entering the car wash. Likewise, more or less than three sensors may be used, as in the example of FIG. 2. All sensors of the car wash 2 can be combined as a detector device.

The data from the sensors 3 and 4 or 5 or from the camera are transmitted by wire or wirelessly to a computing unit 6 of the car wash in order to determine the vehicle position and vehicle orientation. This computing unit 6 calculates from the signals from the detector device and/or from the signals from the sensors the vehicle orientation and the vehicle position and provides a corresponding control signal to the vehicle. For this purpose, the computing unit 6 forwards the control signal to a transmission device 7, which enables wireless communication with the vehicle 1. The motor vehicle 1 has in turn a receiving device 8, which is connected to a vehicle controller 9. The vehicle controller 9 receives from the receiving device 8 the control signal from the computing unit 6 of the car wash.

The control signal corresponds to the first data transmitted from the car wash 2 to the motor vehicle 1. These first data may be further processed to a greater or lesser extent. In the simplest case, the first data contain only the raw data from the sensors, with the vehicle controller 9 directly processing the raw data. In another embodiment, the raw data from the sensors and/or from the detector device are processed into the vehicle position data and vehicle orientation data and transmitted in this form data to the motor vehicle 1 as the first data. The vehicle controller 9 then uses the vehicle position data and vehicle orientation data to control the vehicle. In another embodiment, the raw data from the detector device of the car wash are further processed the computing unit 6 to a specific driving signal which includes, for example, a driving direction and a driving distance. These first data are then further processed by the vehicle controller 9 with very little effort. Detecting a vehicle position and a vehicle orientation is thus to be understood as simply detecting vehicle position data and vehicle orientation data.

When the computing unit 6 or the vehicle controller 9 has calculated a driving trajectory, the vehicle 1 then moves along the corresponding trajectory in autonomous mode.

In one embodiment, the entire entrance trajectory is calculated in advance up to a predetermined or predeterminable washing position, with the vehicle then moving into the car wash accordingly. In another embodiment, only a part of the entire entrance trajectory is calculated, and the trajectory is continuously updated until the car wash transmits a stop signal to the vehicle, thereby stopping the vehicle. In the second embodiment, the current vehicle position and/or the current vehicle orientation must be determined when entering the car wash. This can be implemented with a plurality of sensors 3 to 5 and 10 to 15. The number of sensors in the example of FIG. 2 is to be regarded as purely symbolic. The number of sensors is to be adapted to the respective requirements. For example, photoelectric sensors 10, 11 and 14, 15 may be used to determine exact longitudinal vehicle positions. In addition, other distance sensors 12, 13 which monitor the lateral position of the vehicle in the car wash may be integrated in the car wash 2.

With the plurality of sensors in the car wash, for example, a washing position and possibly also a drying position can then be accurately approached and/or determined following an onward move. The car wash sensors can also assist exiting of the car wash and optionally also the onward travel outside the car wash.

Advantageously, the comfort during use of a vehicle is enhanced by the aforedescribed autonomously entering or driving through the car wash. In addition, autonomous driving in a car wash also enhances safety not only for the vehicle, but also for the car wash itself.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for autonomously driving a motor vehicle in a car wash, the method comprising:
    the car wash transmitting to its surroundings an identification signal (Ping) which includes at least one of an identity and a type of the car wash and an exact location of the car wash,
    detecting a vehicle position and a vehicle orientation of the motor vehicle in the car wash or in proximity of the car wash with a detection device integrated in the car wash and generating respective first data,
    transmitting the first data from the car wash to the motor vehicle,
    automatically entering the car wash with the motor vehicle based on the transmitted first data,
    transmitting second data from the car wash to the motor vehicle after a predetermined washing operation has been performed on the motor vehicle, and
    depending on the second data, automatically controlling the motor vehicle so as to cause the motor vehicle to move onward inside the car wash or to exit the car wash.

2. The method of claim 1, wherein the vehicle position and the vehicle orientation are detected by using ultrasound, radar or a laser.

3. The method of claim 1, wherein the vehicle position and the vehicle orientation are detected based on at least one of an image from a camera, a capacitive measurement and an inductive measurement.

4. The method of claim 1, wherein at least one of the first and the second data are wirelessly transmitted from the car wash to the motor vehicle.

5. The method of claim 1, wherein the vehicle assumes a washing position after entering the car wash, and wherein the motor vehicle is moved onward into a drying position in the car wash.

6. The method of claim 1, wherein moving onward includes exiting the car wash.

7. The method of claim 1, further comprising, prior to automatically entering the car wash, informing a driver in the motor vehicle that the car wash is configured for autonomous driving.

8. The method of claim 4, wherein the first and the second data, respectively, are transmitted via Bluetooth or WLAN.

9. The method of claim 6, further comprising automatically notifying a driver of the motor vehicle, after the motor vehicle has automatically exited the wash, that the motor vehicle has exited the car wash.

10. A car wash configured for autonomous driving of a motor vehicle in the car wash, comprising:
    a detector device configured to detect a vehicle position and a vehicle orientation of the motor vehicle in the car wash or in proximity of the car wash and to generate respective first data, and
    a transmission device configured to transmit to surroundings of the car wash an identification signal (Ping) which includes at least one of an identity and a type of the car wash and an exact location of the car wash, the transmission device further configured to transmit the first data from the detector device to the motor vehicle, wherein the first data enables the motor vehicle to automatically enter the car wash, and to transmit second data from the car wash to the motor vehicle after a predetermined washing operation has been performed on the motor vehicle, wherein the second data causes the motor vehicle to automatically drive onward inside the car wash or to automatically exit the car wash.

* * * * *